United States Patent [19]

Mutschler et al.

[11] 3,965,313
[45] June 22, 1976

[54] RETURN DEVICE FOR A DIRECTION INDICATING SWITCH

[75] Inventors: Erich Mutschler; Adam Weber, both of Bletigheim, Wurttemberg, Germany

[73] Assignee: SWF-Spezialfabrik fur Autozubehor Gustav Rau GmbH

[22] Filed: Oct. 24, 1974

[21] Appl. No.: 517,776

[30] Foreign Application Priority Data
Dec. 7, 1973 Germany............................ 2361063

[52] U.S. Cl............................ 200/61.27; 200/61.34
[51] Int. Cl.²............................................. H01H 3/16
[58] Field of Search..................... 200/61.27–61.35

[56] References Cited
UNITED STATES PATENTS

| | | | |
|---|---|---|---|
| 2,657,287 | 10/1953 | Lincoln et al..................... | 200/61.34 |
| 2,817,728 | 12/1957 | Gurney........................ | 200/61.27 X |
| 2,999,911 | 9/1961 | Dryer et al....................... | 200/61.34 |
| 3,227,252 | 1/1966 | Findley......................... | 200/61.27 X |
| 3,239,619 | 3/1966 | Brown et al. ..................... | 200/61.34 |
| 3,240,890 | 3/1966 | Brown............................ | 200/61.34 |
| 3,271,540 | 9/1966 | White............................ | 200/61.34 |
| 3,372,252 | 3/1968 | Stoi et al........................ | 200/61.34 |

OTHER PUBLICATIONS
B323,191, Jan. 1975, Wendling 200/61.3.

*Primary Examiner*—James R. Scott
*Attorney, Agent, or Firm*—McGlew and Tuttle

[57] ABSTRACT

A return device for a direction indicating switch used with a vehicle steering wheel, comprises a movable switch member which is of arcuate form and is displaced by actuation of a lever member through an arcuate path of movement in order to displace a release spring which is pivotally mounted thereon to either a first or a second indicating position on respective sides of a neutral position. A release member which is in the form of a pin carried on a member which moves through an arc at a smaller radius than the switch member and which pin is adapted to be positioned in a neutral position when the steering wheel of the vehicle is steered straight ahead. When the steering wheel is turned, the release pin is moved so that it initially depresses a tangentially extending resilient portion of the spring which is provided on each side of the neutral position. The construction includes a guide means for guiding each spring side so that when it moves in a given direction away from neutral, the spring end is deflected into the path of the release pin. During the return move of the release pin with the steering wheel, it drives the spring back to a neutral position and it is centered in the neutral position by the guide means.

6 Claims, 2 Drawing Figures

RETURN DEVICE FOR A DIRECTION INDICATING SWITCH

FIELD AND BACKGROUND OF THE INVENTION

This invention relates in general to the construction of steering indicating devices for vehicles and, in particular, to a new and useful return device for a direction indicating switch.

DESCRIPTION OF THE PRIOR ART

Switching devices for indicating directions of intended movement of vehicles are known which may be positioned in an indicating position for either a left or a right turn, and which will be returned to a neutral position automatically after the vehicle completes the turn. In the known devices, the steering column is provided with a release cam which controls a switching cam mounted on the switch member so that the switching cam restores the switch member to the off position when the steering column is correctly rotated. These known return devices require a complicated steering column switch which may fail to switch reliably because of the large number of parts to be brought into operative engagement with each other. In addition, the construction of the switch is adapted to very specific steering angle differences. This means that a differently designed steering column switch must be provided for different steering columns, particularly, with regard to the formation of the return device.

SUMMARY OF THE INVENTION

The invention provides a return device for a direction indicating switch which is adapted to be used on the steering column of a motor vehicle and which is simple and reliable and is easily adaptable to differences of steering angle without influencing the other parts of the steering column switch. The return device of the invention includes a housing with a switch member movable into either one or two adjacent locked operational positions by means of a switch lever from a neutral off position or neutral position. A release member is mounted to rotate on the switch member and has two release springs extending in respective opposite directions of rotation of movement. The release member, with the release springs, are in contact with a guide on the switch housing so that when the swtich member is moved to an operating position, the associated release spring is deflected into the path of movement of a release pin mounted on the steering wheel. The release springs are such that the release pin bends a deflected release spring when the wheel is turned away from a straight-ahead position, but contacts and drives the switch member to the central or neutral position when the wheel is returned to the straight ahead position.

The release member comprises only a single part which is controlled by a release pin mounted on an arcuate member around the steering wheel. The release springs are constructed so that each end forms generally radially extending parts which form drive surfaces which are driven by the release pin during the return movement. In addition, they include tangentially extending resilient parts which are reflected during the movement of the release pin with the steering wheel turned. By making the release spring so that it includes a central hub portion which is pivotally mounted on the switch member and includes generally circumferentially extending arm portions which have radially extending ends forming drive surfaces and which include tangentially extending outer resilient surfaces all in a simple single part means that the manufacture of such a device may be much easier and less expensive.

Both the release member which carries the release pin, and the switch member which carries the release spring are of arcuate configuration and may be arranged concentrically to the steering column and be of radii such that the release member rides inside the switch member. The switch member carries an upstanding pin and the release springs include a central hub portion which is rotatable on the pin and it is also provided with an arm portion which extends generally circumferentially outwardly to each side. The release member carries a locking spring arm which engages into a circumferentially extending groove of the switch member. In this manner, the release member is safely and detachably secured on the switch member.

Pivoting of the release member is ensured by guiding the release springs over a guide wall of the switch housing two-point engagement. The pivotal movement of the spring release member is effected by a guide means in the form of a guide wall directly adjacent the periphery of the release spring which effect displacement of each arm portion of the release spring outwardly into the path of the release pin. The guide wall is limited approximately to an angle in which the release member occupies in the center or off position of the switch member. During the return movement of the release pin on the release member, when the steering wheel is returned to a straight-ahead position, it engages an end of the spring arms and deflects it back into a central position within the guide wall. A feature of the construction is that the release spring may be dimensioned so that its arm portions can be deflected into and out of the range of operation of the release pin in accordance with the particular installation and the amount of movement which must take place. Both the release spring and the guide wall therefor may be sized or dimensioned to adapt them to the various steering angles which are necessary for each steering installation.

Accordingly, it is an object of the invention to provide an improved return device for a direction indicating switch used in association with a steering column mechanism which comprises a switch member which is moved to indicate a turn and which carries a release spring having arm portions extending outwardly in each direction away from a central neutral position and which are deflected by a guide wall into the path of a release pin which is movable with the steering wheel, the release pin being designed so that it has a driving projection whch may be engaged by the release pin to deflect the release spring back to a neutral position upon return of the steering wheel to a straight steering position, and it also includes a portion which must be biased or deflected outwardly upon movement of the release pin with the steering wheel.

A further object of the invention is to provide an indicating device whch may be adapted to various steering angle ranges and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
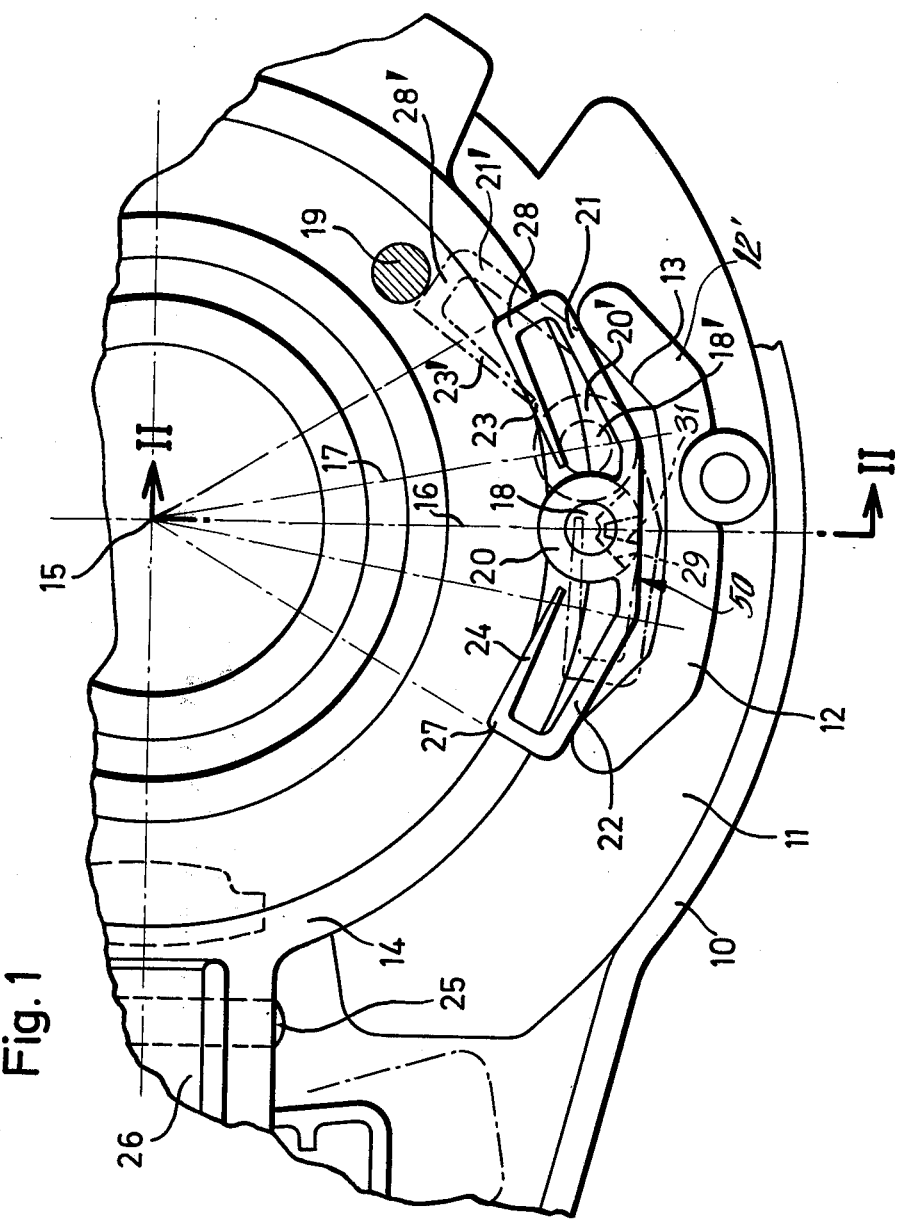
FIG. 1 is a partial plan view of a steering column switch constructed in accordance with the invention.

Referring to the drawings in particular, the invention embodied therein, comprises a return device for a direction indicating switch used with a vehicle steering wheel and which is advantageously mounted concentrically around the center 15 of a steering column (not shown).

In accordance with the invention, the apparatus includes an arcuate switch member 14, of generally ring-shape configuration which is journalled to rotate on a bracket-like switch housing 11 under the guidance of a circlip 32. The switch member is moved by means of a switch lever (not shown) which is mounted in a collar 26 and which is secured thereto by means of a bearing pin 25. When the lever is moved, it causes a rotation of switch member 14. In addition, the lever in collar 26 may be moved perpendicularly to the operating plane of switch member 14. The switch member 14 operates electrical contacts (not shown) for the purpose of indicating a turn, for example, with a flashing light. The location of the actuating parts of the contacts which are controlled by movement of the switch member 14 determines the center or off or neutral position which, as shown in the embodiment of the invention, comprises the position at which the bearing pin 18 is centered along a radius line 16.

Figure 2:
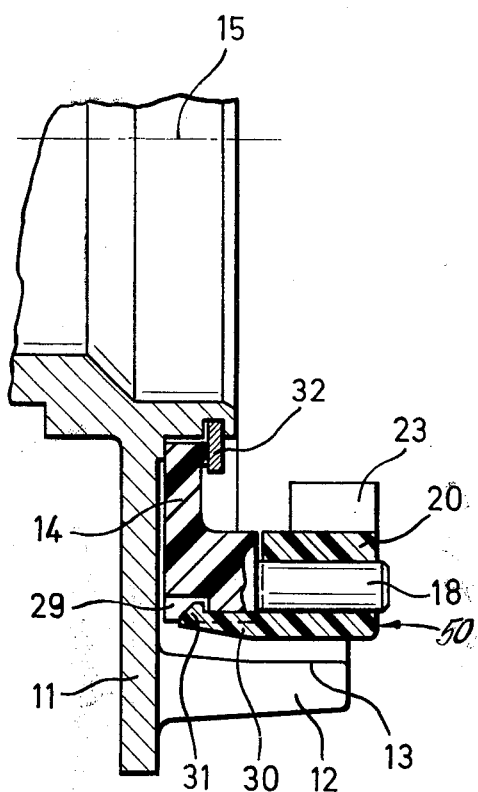
FIG. 2 is a section taken along the line II—II of FIG. 1.

Switch member 14 carries bearing pin 18 which provides a rotatable mounting for a sleeve portion 20 of a combined locking spring and release spring, generally designated 50. As shown particularly in FIG. 2, the combined locking and release spring 50 includes a lock spring arm portion 30 which has an extension or hook portion 31 which engages in a circumferentially extending groove 29 of the switch member 14. The locking extension 31, which engages in groove 29 of switch member 14, secures the combined release spring and locking spring 50 to the switching member 14, but permits it to rotate relatively thereto on pin 18.

The combined release spring and locking spring 50 includes two spring arm portions 21 and 22, which extend outwardly in each swing direction and are preferably molded integrally with sleeve portion 20 and locking extension 30. Guide means, in the form of a guide wall 13, is centered in respect to a neutral radius line 16, and it provides a fixed guide for the release spring arms 21 and 22. The combined release and locking spring 50 includes radially extending end portions 27 and 28 at the ends of arms 21 and 22 which form driving surfaces which are engaged by a release pin 19 carried on an arcuate release member which moves with the steering column.

In the center neutral position, the release spring arms 21 and 22, together with driving surfaces 27 and 28, and also deflecting spring portions 23 and 24 which extend substantially tangential, are all positioned so that they do not extend into the path of swing of the release pin 19. When the vehicle is being steered straight ahead, release pin 19 will be positioned so as to center it on the neutral position radius 16. When the steering wheel is turned in one direction or the other, the pin 19 moves along with it. Switch member 14 will be turned counterclockwise when the hand operated signal lever (not shown) is manually moved downwardly to cause the bearing pin 18 to move to the radius 17 and assume the position indicated in dotted lines at 18'. During the movement of switch member 14, the guide wall 13 with the side ridges 12 and 12' cause a deflection and rotation of sleeve 20 on bearing pin 18. The ridges 12 and 12' cause the inward deflection of the adjacent arm 21 and 22 toward the center 15. In the resultant locked operating position, release spring arm 21 is located at the deflected position 21' and the driving surface 28 is located at the position 28'. The deflecting spring portion 23 is located at the position 23' shown in dotted lines. If, when in such a position, the steering wheel, after having been turned in a counterclockwise direction, is then turned in a clockwise direction, back toward the neutral position in which the vehicle is steered straight ahead, the release pin 19 will drive the combined release spring and locking spring 50 at drive surface 28 and return the switch member 14 to the center off position or neutral position, wherein pin 18 will be centered on the radius 16. At the same time, the combined release and locking spring 50 will be deflected back again by the guide means 13 and the ridges 12 and 12' thereof.

If the steering wheel is turned counterclockwise after similar rotation of the switch member, release pin 19 strikes against the deflected surface 23' so as to deflect arm 21' without the operating position of switch member 14 being changed. The deflection of release spring arm 21' is not impeded by ridge 12' of switch housing 11 because it is positioned beyond the end thereof and may move outwardly from the center 15, and thus out of the path of pin 19.

Conditions are similar if the switch member 14 assumes the other locked operating position when the lever is moved upwardly. The release spring arm 22, with the driving surface 27 and the spring portion 24 are deflected into the path of rotation of the release pin 19. If the steering wheel is then turned in a clockwise direction, it will first deflect the spring surface 24 but then it will move into a position in which it is behind the driving surface 27 so that it will have to return the combined release and locking spring 50 to the neutral position when the steering wheel is returned counterclockwise to a straight-ahead steering position.

A cover 10 protects the entire operating mechanism of the steering switch.

While a specific embodiment of the invention has been shown and described in detail to illustrate the application of the principles of the invention, it will be understood that the invention may be embodied otherwise without departing from such principles.

What is claimed is:

1. A return device for a direction indicating switch used with a vehicle steering wheel, comprising a manually movable switch member movable alternatively and selectively from an intermediate neutral position to a respective first and second indicating position on the respective sides of said neutral position, a release member adapted to be positioned in the neutral position when the vehicle is steered straight ahead and to move with the steering wheel in a direction away from the neutral position toward one of said first and second indicating positions, a release spring pivotally mounted on said switch member and having a first and second drive portion on respective ends which extend toward a respective first and second indicating position and which include resilient side portions which are deflected by said release member when it moves past the associated release spring, and fixed rigid guide means adjacent said release spring providing a guide deflection located to direct a respective drive portion into the path of movement of said release member, said release member being movable upon return of the steering wheel to a straight ahead steering position to contact said drive portions and move said release spring with said switch member back to a starting position, said guide means providing a further guide deflection to center said release spring in the neutral position.

2. A return device for a direction indicating switch used with a vehicle steering wheel, according to claim 1, wherein said release spring comprises a central sleeve portion with an arm portion extending outwardly from each side, said switch member having a bearing pin engaged within said sleeve portion and permitting rotation of said sleeve portion thereon.

3. A return device for a direction indicating switch used with a vehicle steering wheel, according to claim 1, wherein said switch member includes a circumferentially extending groove, said release spring including a locking spring element extending outwardly therefrom and engaged in the groove of said switch member, said locking spring permitting pivotal movement of said release spring relative to said switch member.

4. A return device for a direction indicating switch used with a vehicle steering wheel, according to claim 1, wherein said release spring includes an arm portion extending outwardly from a central sleeve portion, bearing means supporting said sleeve portion for rotation thereon, said arm portions having inwardly extending ends extending along a radius line forming said drive surfaces, and an inwardly extending resilient portion extending inwardly from said drive surfaces, said switch member being substantially ring-shaped and said resilient surfaces of said release spring extending substantially tangential to a radius of said ring.

5. A return device for a direction indicating switch used with a vehicle steering wheel, according to claim 1, wherein said switch member is ring-shaped and rotates about an arc having a center at the center of the steering column, said guide means including an upstanding guide wall with a lateral ridge on each side extending inwardly toward the center of rotation for deflecting the arms of said release spring into a neutral position and for causing pivotal movement of said release spring to deflect the arm which is moved in the direction of movement inwardly by a greater extent to position it in line with said release member.

6. A return device for a direction indicating switch used with a vehicle steering wheel, according to claim 5, wherein said guide wall ridges are disposed at angles substantially comparable to the angles of said spring arms.

* * * * *